UNITED STATES PATENT OFFICE.

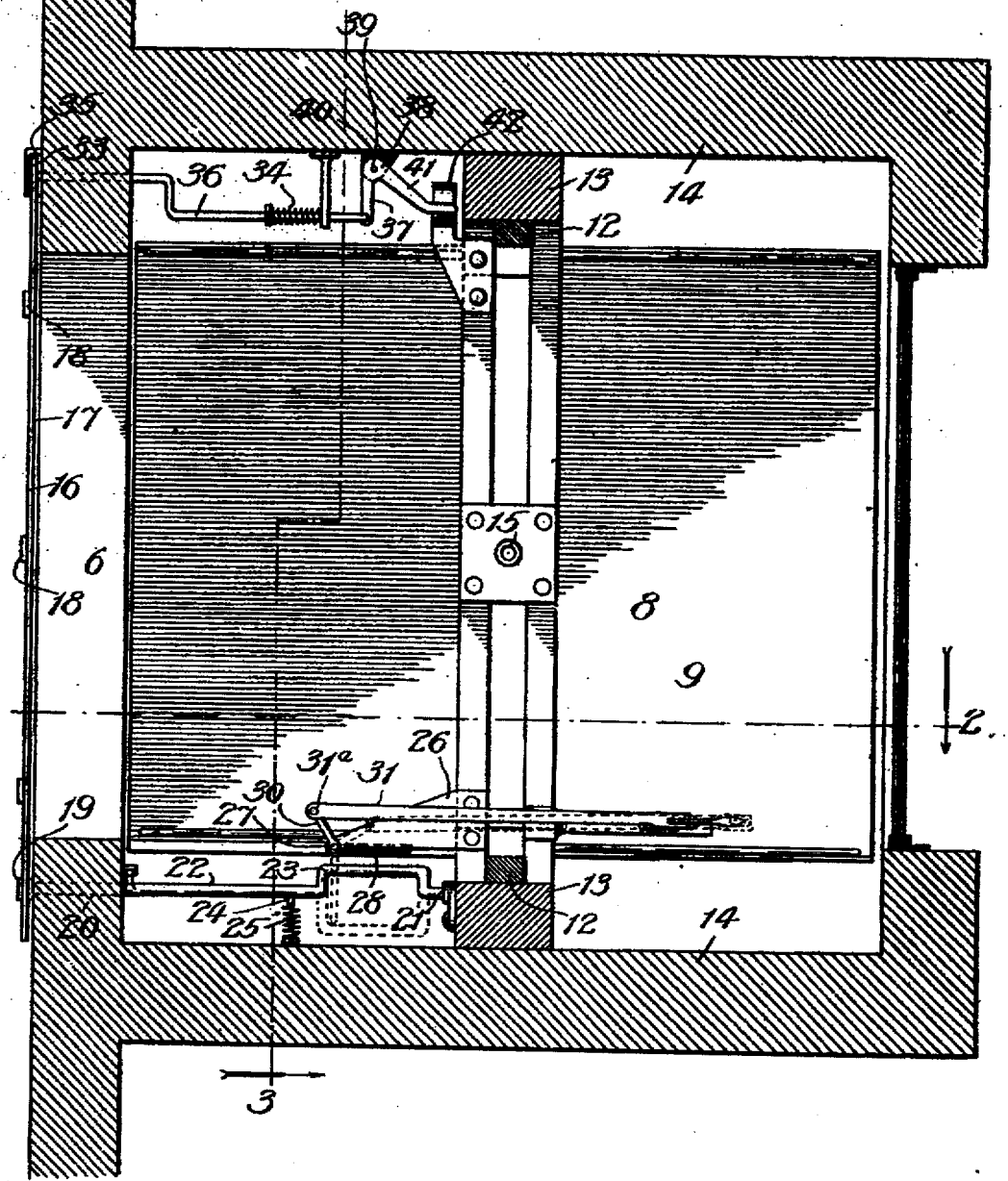

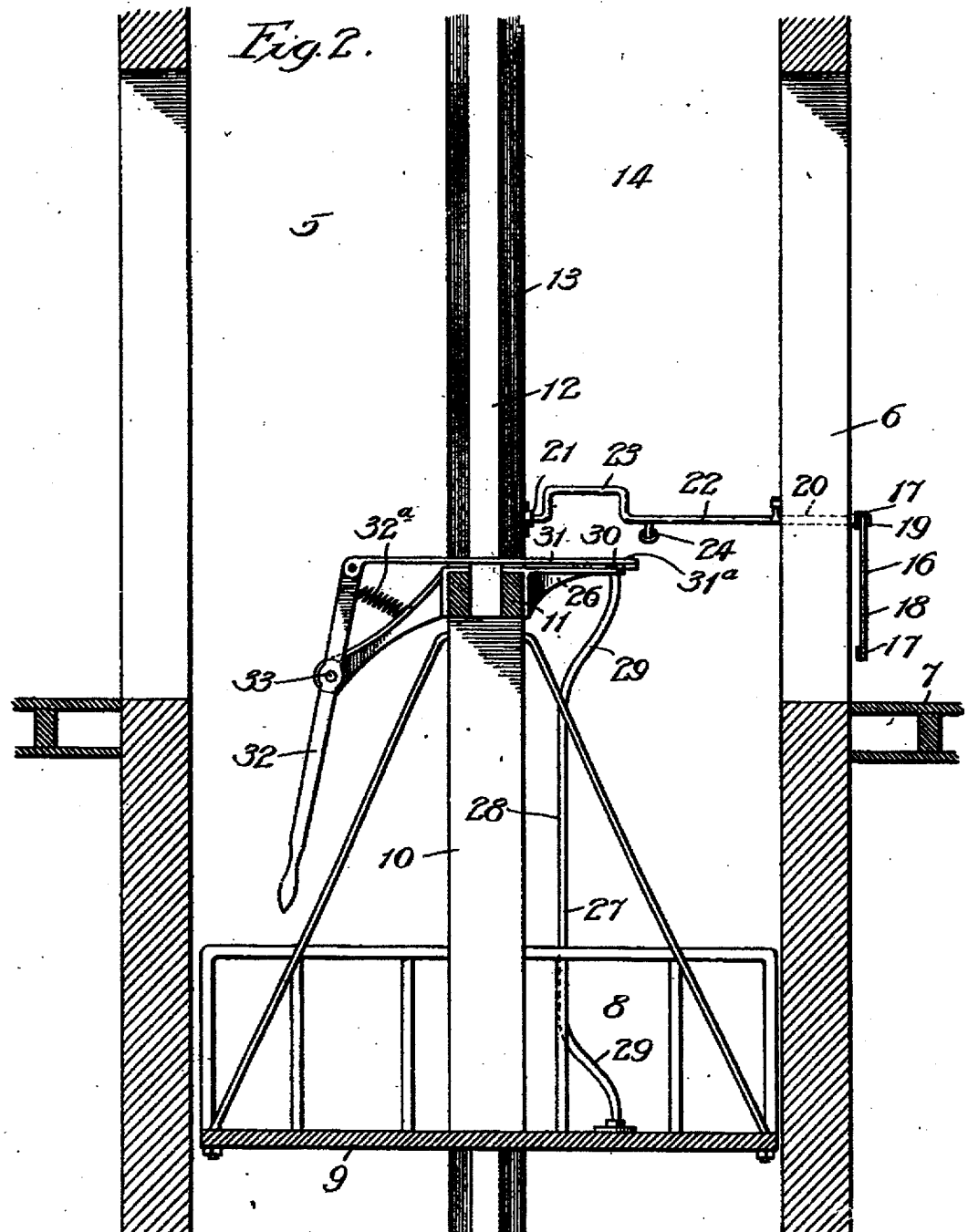

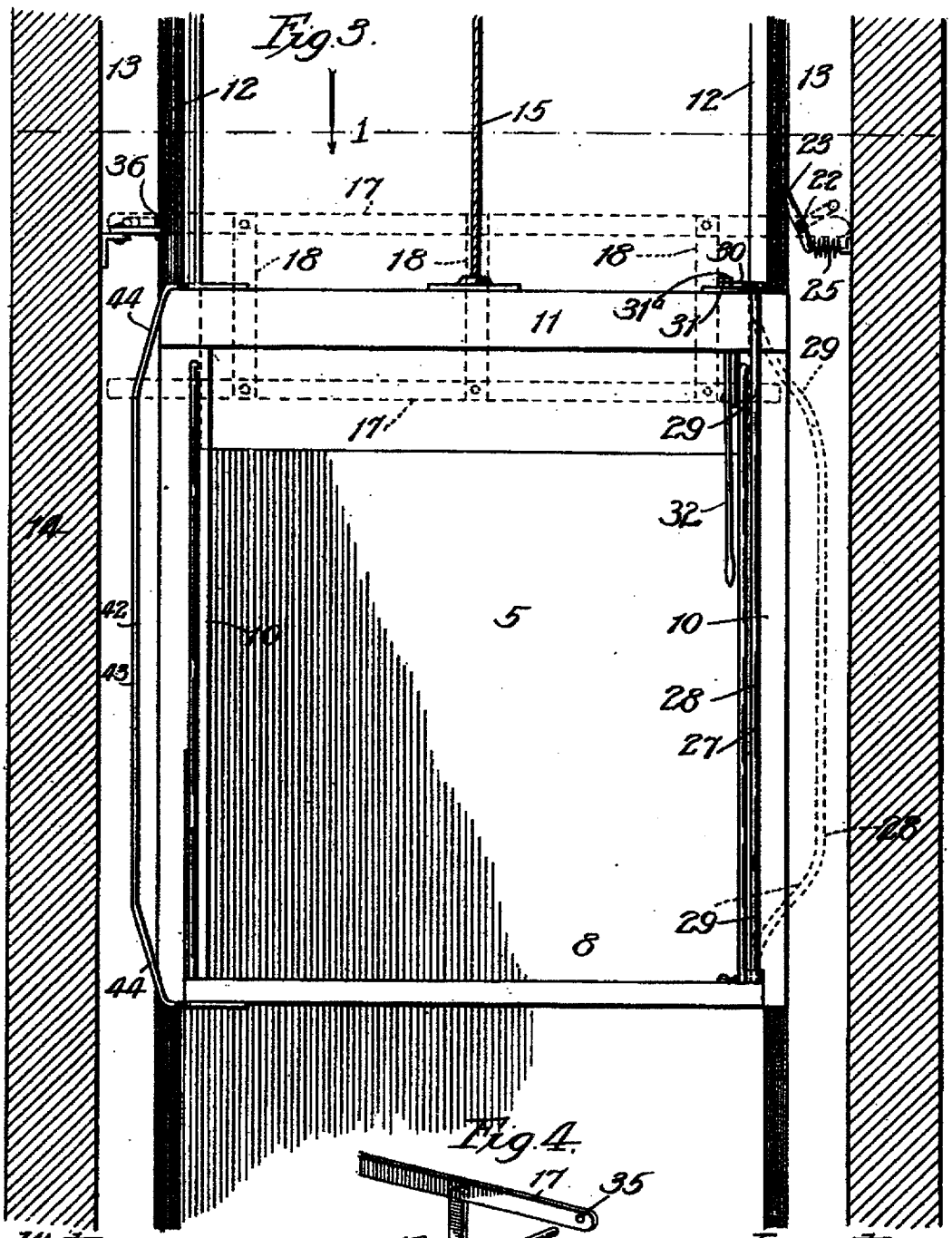
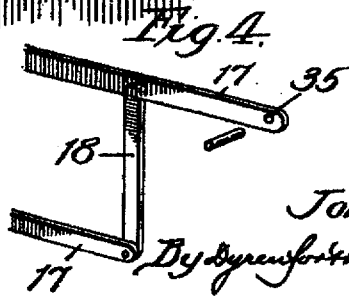

JOHN G. MEISNER, OF CHICAGO, ILLINOIS.

ELEVATOR.

970,730.  Specification of Letters Patent.  Patented Sept. 20, 1910.

Application filed January 5, 1910. Serial No. 536,498.

*To all whom it may concern:*

Be it known that I, JOHN G. MEISNER, a citizen of the United States, residing at Chicago, in the county of Cook and State of Illinois, have invented a new and useful Improvement in Elevators, of which the following is a specification.

My object is to provide improvements in elevator apparatus, to the end of affording barrier means at the floors opening into the elevator-shaft, which shall be operated by the movements of the elevator, under the control of an operator, to open and close the shaft to the floors, as desired.

Referring to the accompanying drawings, Figure 1 is a horizontal sectional view taken through an elevator-shaft equipped with a car shown in plan, the apparatus illustrated embodying my invention, and the section being taken at the line 1 on Fig. 3 and viewed in the direction of the arrow; Fig. 2 is a section taken at the line 2 on Fig. 1 and viewed in the direction of the arrow; Fig. 3 is a section taken at the line 3 on Fig. 1 and viewed in the direction of the arrow, showing the gate by dotted representation; and Fig. 4, a perspective view, in the nature of a diagram, of one end of the barrier-gate and a coöperating lock therefor.

The elevator-shaft, a portion only of which is illustrated, is represented at 5, and is shown as provided with an opening 6 opposite to a floor 7 of a building, it being understood that the shaft, in practice, reaches from the top to the bottom of the building, and that an opening 6 is located at each floor. The elevator-car, shown as of a construction suitable for carrying freight, is represented at 8, this car being formed with a platform 9, upright side-members 10 and a cross-head 11, and operating at its members 10 on upright guides 12 carried by upright beams 13 secured to the sides 14 of the shaft. Any suitable means for raising and lowering the car may be provided, but, as these means form no part of my invention and are well understood in the art, I have merely shown a holding cable 15 attached to the cross-head 11 of the car through the medium of which the latter may be raised or lowered.

Each opening 6 from the elevator-shafts to the floors is protected by barrier means in the form of a gate 16 comprising, preferably, a pair of horizontally disposed bars 17, spaced apart and of a length greater than the width of the opening 6, and transverse bars 18 pivotally connected at their opposite ends to the bars 17, the upper one of the bars 17 being pivotally connected at one end, as indicated at 19, to cause the gate to extend across the opening 6 and form a removable barrier to the elevator-shaft when in one position, as represented in dotted lines in Fig. 3, it being designed that this gate be swung on its pivot to raised position by the movement of the car when it is desired that the floor protected thereby be opened to the car in the shaft, the means for accomplishing this purpose being as follows: Journaled at one end in the wall of the building and at its opposite end in one of the uprights 13, as indicated at 20 and 21, respectively, to extend into the elevator-shaft, is a rock-shaft 22 having an offset portion 23, the outer end of this shaft being connected with an end of the upper one of the bars 17 of the gate to afford the pivotal connection of the latter above referred to, whereby when the shaft 22 is rotated it will cause the gate to be swung up or down, depending upon the direction in which the shaft is moved. The shaft 22 carries a lug 24 to which one end of a coiled spring 25, secured at its opposite end to a wall of the shaft 5, is attached. The arrangement of this spring is such as to tend to cause the rock-shaft normally to occupy a position in which the gate will be closed, and the offset portion 23 is so disposed as to cause it to assume the upwardly inclined position represented in full lines in Fig. 3 when the gate is in normal position. Thus, when the rock-shaft is turned by swinging it to the right in Fig. 3, it will be moved against the action of the spring 25 to open the gate. Journaled at its upper end in a bracket 26 on the cross-head 11 and at its lower end in the platform 9, is an upright striker-bar 27 formed with an offset straight portion 28 and inclining end-portions 29, this bar being located on the car in a position in which it will engage at its portions 28 and 29 with the offset portion 23 of the rock-shaft to turn the latter when the bar 27 is swung to the position indicated by dotted lines in Fig. 3. Thus, when the bar 27 is in the position referred to, and the car is moving either up or down in the shaft, it will engage with the offset portion 23 of the rock-shaft thereby turning the latter and raising the gate, the gate being held in raised position until the car has moved sufficiently far to move the bar 27 out of engagement with the shaft 22, whereupon the latter, under the action of its spring 25, will return to normal position for closing the gate. The arrangement of parts described is such as to cause the gate to be moved to open condition during the rise or descent of the car, as the case may be, and hold it in open position while the car is opposite the floor protected thereby.

It is intended that the operation of the bar 27, to cause it to occupy operative or inoperative position with relation to the rock-shaft, be under the control of the elevator-car operator, whereby he may operate the gates as described at any floor desired to be opened to the shaft, and as a means for so controlling this action I prefer to provide those illustrated, a description of which is as follows: The upper end of the bar 27 carries a link 30 to the free end of which one end of a bar 31 is pivotally connected, as indicated at 31ª, the other end of this bar being pivotally connected with the upper end of an operating lever 32, fulcrumed between its ends, as indicated at 33, to the bracket 26, the lower end of this lever being located within the reach of the car operator. Thus, by swinging the lever on its fulcrum the bar 27 may be turned in its bearings to move it into or out of operative position, depending on the direction in which the lever is swung.

A spring 32ª is connected with the lever 32 and its supporting bracket, and tends to swing the lever at its lower end to the left in Fig. 2, whereby the bar 27 is automatically returned to normal inoperative position when the operator releases his hold on the lever 32.

It is preferred that means be provided for maintaining the gate locked in closed position excepting at those times when it is desired that it be raised as described, and as a means for accomplishing this purpose I provide the following described construction: The free end of the gate rests normally at the outer end of its upper bar 17 in a channeled stop 33 secured to the wall of the building adjacent to the opening in the shaft 5 to be protected, and extending normally under the action of a coiled spring 34, through the wall of the building and an opening 35 in the free end of the upper bar 17, is a rod 36 which serves to prevent the gate from being raised while the rod extends through the opening 35. The rear end of this rod is pivotally connected with an arm 37 of a bell-crank lever 38 fulcrumed between its ends, as indicated at 39, to a bracket 40 secured to a side-wall of the shaft 5, the other arm 41 of this lever extending into the path of a striker-bar 42 secured to the cross-head 11 and platform 9 of the car. This striker-bar is provided with a straight offset portion 43 and deflected end-portions 44, the portion 43 of the bar 42 being longer than the portion 28 of the bar 27 and extending beyond the latter at its upper and lower ends. Thus, when the bar 42 engages with the arm 41 of the lever 38 during the movement of the car, it will withdraw the rod 36 from engagement at its outer end with the upper one of the gate-bars 17 and permit the gate to be raised, holding the rod 36 in withdrawn position until the bar 42 has passed beyond the arm 41. It will be noted that the bar 42 operates to withdraw the rod 36 from the upper gate-bar 17 before the bar 27 engages with the offset portion of the rock-shaft 22, when the bar 27 is in operative position, and thus the gate is free to be swung open; and, furthermore, that the rod 36 is held withdrawn until the gate has been lowered to closed position.

It will be readily understood from the foregoing that, so long as the lever 32 and bar 27 are in the position represented in Fig. 2, movement of the car in the shaft in either direction will not operate the gate. Thus, when the operator desires to open the gate opposite the floor at which he wishes to stop the car, he throws the lever 32 to the right in Fig. 2 against the action of the spring 32ª before arriving at the floor at which he wishes to stop, thus swinging the bar 27 to the position represented by dotted lines in Fig. 3 with the result of causing the bar 27 to ride against the offset portion of the shaft 22, turning the latter and raising the gate, it being understood that before the car 27 engages with the rock-shaft to turn it, the bar 42 strikes the arm 41 and withdraws the rod 36 from engagement with the upper gate-bar 17. As soon as the car, in moving beyond the gate thus opened, moves sufficiently far to cause the bars 27 and 42 to be moved out of engagement with the rock-shaft 22 and arm 41, respectively, the shaft 22 and rod 36 return to normal position under the action of the springs 25 and 34, respectively, thus closing and locking the gate, and upon the release of the lever 32, by the operator, the bar 27 is automatically returned to normal inoperative position.

It will be understood from the foregoing that, where a number of floors of a building communicate with the elevator shaft through openings like the one represented at 6, each of such openings will be protected with a gate, and that the operating mechanism to be actuated by the elevator, as described, will be duplicated at each floor, thus permitting the operator, by manipulating the lever 32, to open the gate protecting any floor either during the ascent or descent of the car.

What I claim as new, and desire to secure by Letters Patent, is—

1. The combination of an elevator-shaft, a car movable in said shaft, a movable barrier for the opening in the shaft, a vertically disposed striker-bar pivoted at its upper and lower ends to the car to cause it to swing about a vertical axis and provided with a deflected striker-portion, and means adapted to be engaged by said bar when the latter is in one position for removing the barrier.

2. The combination of an elevator-shaft, a car movable in said shaft, a rock-shaft having an offset-portion, a barrier operated by said rock-shaft, and a vertically-disposed striker-bar having its upper and lower ends deflected, said bar being pivoted at its upper and lower ends to the car to cause said bar to swing about a vertical axis into and out of position for engaging with the offset-portion of said shaft.

3. The combination of an elevator-shaft, a car movable in said shaft, a movable barrier for the opening in the shaft, a vertically-disposed striker-bar pivoted at its upper and lower ends to the car to cause the bar to swing about a vertical axis and formed with a deflected striker-portion, means adapted to be engaged by said bar when the latter is in one position for removing the barrier, and lever mechanism connected with said bar, for the purpose set forth.

4. The combination of an elevator-shaft, a car movable in said shaft, a vertically-disposed striker-bar pivoted on said car, a barrier, means coöperating with the barrier and with said bar, when the latter is swung on its pivots to a certain position, for removing the barrier, and means for operating said bar comprising an operating-lever fulcrumed on said car, a link fixed on said striker-bar, and a second link secured to the outer end of said first-named link and with said operating-lever, for the purpose set forth.

5. The combination of an elevator-shaft, a car movable in said shaft, a movable barrier for the opening in the shaft, a vertically-disposed striker-bar pivoted at its upper and lower ends on said car to cause it to swing about a vertical axis and provided with a deflected striker-portion, means adapted to be engaged by said bar when the latter is in one position for removing said barrier, and means operating automatically to turn said last-named means to inoperative position, for the purpose set forth.

JOHN G. MEISNER.

In presence of—
W. B. DAVIES,
R. A. SCHAEFER.